March 11, 1930.   J. W. MacDONALD   1,750,045
METHOD OF AUDITION AND APPARATUS FOR PRACTICING THE SAME
Filed Nov. 1, 1928   2 Sheets-Sheet 2
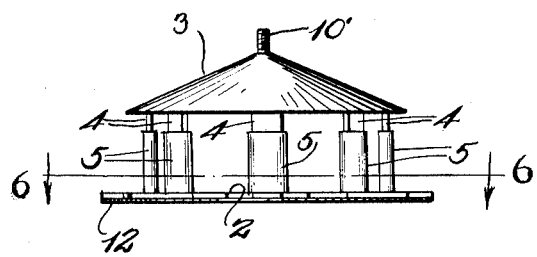
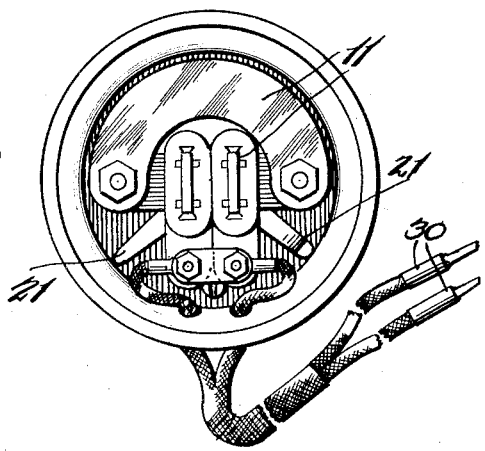
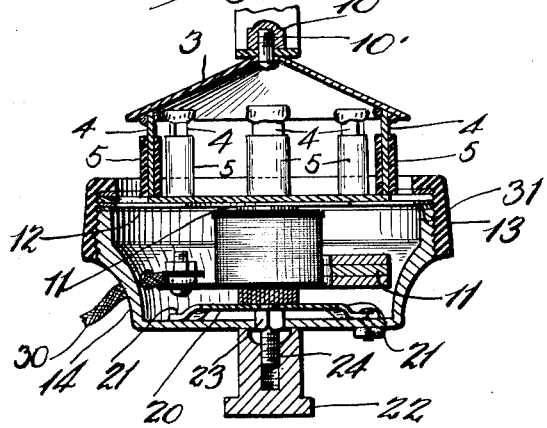
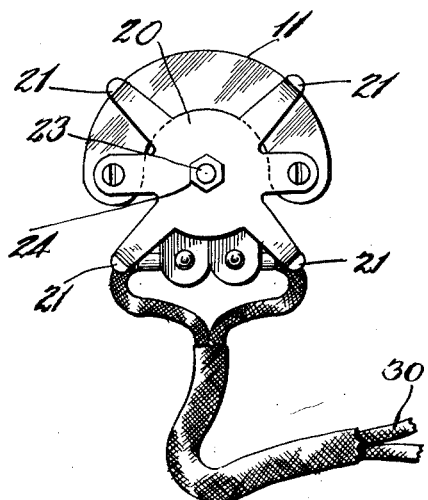
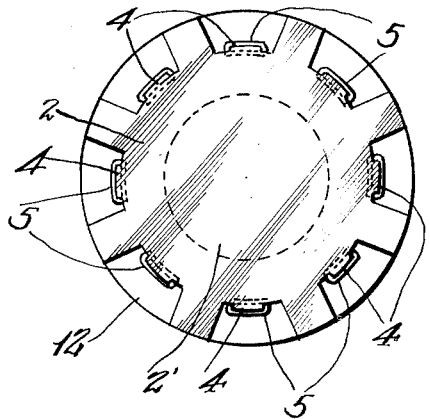
INVENTOR.
Joel W. MacDonald.
BY Foster + Cordier
ATTORNEYS Patented Mar. 11, 1930

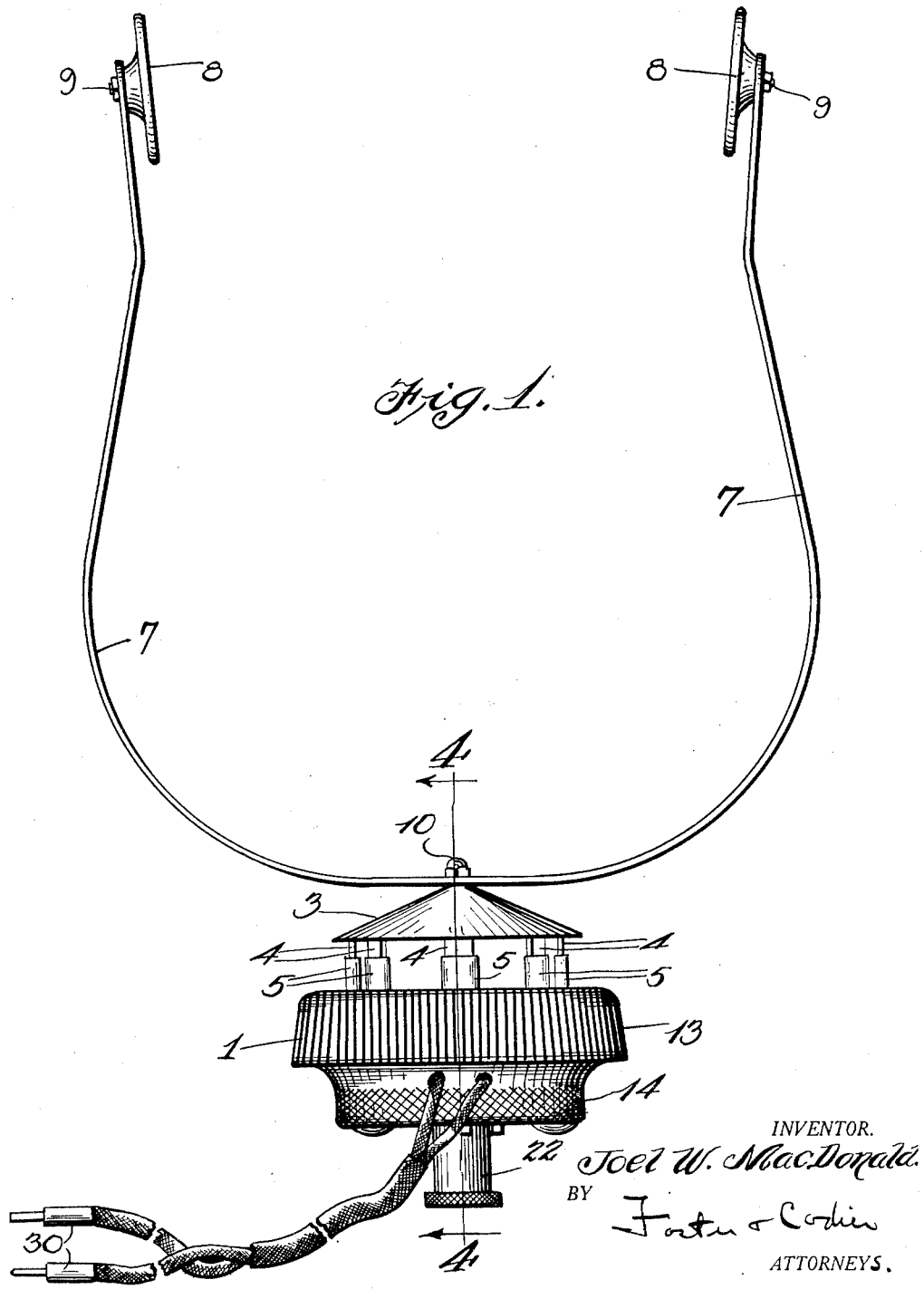

1,750,045

UNITED STATES PATENT OFFICE

JOEL W. MacDONALD, OF HOUSTON, TEXAS, ASSIGNOR OF FIFTEEN PER CENT TO A. B. PRESCOTT, TWENTY PER CENT TO A. H. KOENNECKE, AND SIXTY-FIVE PER CENT TO THE TACTIPHONE COMPANY, OF HOUSTON, TEXAS, A CORPORATION OF TEXAS

METHOD OF AUDITION AND APPARATUS FOR PRACTICING THE SAME

Application filed November 1, 1928. Serial No. 316,590.

My invention relates to a process or method of audition and apparatus whereby the involuntary sense of hearing is aided, accentuated and cultivated by the voluntary sense of touch. This is accomplished by conducting the sound-carrying vibrations directly through the skin to the bone and thence to the hearing centers without interruption, by means of a yoke or other member of rigid sound conducting material attached to the vibratory diaphragm of any sound-reproducing apparatus, the said yoke or other member being of any desired and effective sound-carrying material of such construction and rigidity that it receives and imparts the sound impulses from the diaphragm unchanged. The distal ends of the yoke or other member may be fitted with mother of pearl or other vibration carrying material, and so constructed as to fit comfortably on the skin, the preferred points of contact being the mastoid eminence behind the ears and the region of the head in the vicinity thereof. This region is preferred because it is richly supplied with afferent nerves of touch sense, and is therefore the logical place to apply the sound-carrying vibrations for the purpose of cultivating the sense of hearing. The sound-carrying vibrations when applied to the mastoid eminence are carried through the entire length of the mastoid cells and the adjoining petrous portion of the temporal bone. This bony structure which is vibrated throughout by my invention contains the entire inner structure of the hearing apparatus.

Among the objects or purposes of my invention are to provide a new and useful process or method of hearing; to enable persons of normal hearing to cultivate and develop a more accurate and acute sense of hearing capacity; to provide an accurate means of testing and determining the degrees and stages of specific forms of deafness; to enable persons who have partially or totally lost their normal sense of hearing to cultivate and practice hearing by means of this invention; to provide a means of teaching deaf mute children to hear and thereby to learn to talk, which will make possible a full and complete course of schooling for deaf mutes; to enable persons of less than normal hearing capacity to engage in occupations from which they have previously been barred, such as radio, telegraph and telephone work; to provide entertainment and instruction to persons now unable to hear; to enable parents to talk to their deaf mute children in their homes.

My inventive concept is based upon the well known fact of bone conduction of sounds. My experiments and studies have proven that the vibrations necessary to hearing may be had regardless of the estoppages of the eustachian tube to which deafness is ordinarily due and further that persons with an ordinary hearing capacity can develop a more accurate and dependable hearing sense by adaptation and practice of this invention. This is accomplished by reason of the fact that the natural involuntary sense of hearing is limited only by the congenital or acquired defects of the parts, and reacts to the voluntary sense of touch (which is mechanical, and of the desired force and extent) to the full possible hearing capacity. Therefore the present invention includes a new and original method of audition.

My inventive idea is capable of embodiment in different mechanical structures utilizing multiple diaphragms and contact members, to suit the requirements desired. It is desired to point out that the apparatus illustrated in the accompanying drawing is intended merely as a disclosure of the essential features of my invention and that various changes and modifications and desirable additions may be made in and to the structural arrangement therein shown within the scope and spirit of my invention.

In the drawings wherein like characters of reference denote corresponding parts in the several views, Fig. 1 is a perspective view of one form of apparatus embodying the invention.

Fig. 2 is a side view of the diaphragm and its structure for supporting or carrying the yoke or other member of sound transmitting material.

Fig. 3 is front view of an electromagnetic phone with its diaphragm removed.

Fig. 4 is cross section of the phone on the line 4—4 of Fig. 1.

Fig. 5 is a rear view of the electromagnets, and

Fig. 6 is section on the line 6—6 of Fig. 2 looking in the direction of the arrows.

The numeral 1 (Fig. 1) indicates generally the electromagnetic phone or other means for vibrating the diaphragm 2 for the reproduction of sound. The diaphragm 2 in the embodiment of the apparatus shown is of the usual thin magnetic metal construction employed in electromagnetic phones and carries the conical hollow yoke supporting means 3. The conical yoke supporting means 3 is open at its base and is attached to the vibrating diaphragm 2 by means of thin metallic posts 4 rigidly attached to both the vibrating diaphragm and the yoke supporting means, the said posts being distributed more or less uniformly around the disc diaphragm 2 and sufficient in number to securely hold the yoke supporting means 3. The metallic posts 4 and the yoke supporting means 3 are preferably of the same material as the diaphragm. The post 4 may be surrounded by rubber 5 for reducing undesired vibrations. The posts 4 may be conveniently formed by cutting tongues in the circumference of the disk 2 and bending alternate tongues up at right angles to the plane of the disk as shown in Fig. 6.

The yoke 7 is of metallic construction, for example of steel or iron or of other metal capable of transmitting sound waves or impulses throughout its length. It is provided at its distal ends with mother of pearl contact members 8 secured to the yoke by means of screws and nuts 9. As indicated previously, these contact members 8 may be of any suitable material capable of effectually transmitting sound vibrations or waves. If desired the contact members may be of the same material as the yoke 7 and may if desired be formed integral therewith or formed separately and united thereto. The yoke 7 is rigidly attached to the yoke supporting means 3 by means of the nut or cap 10 engaging the screw threaded stud $10^1$ secured at the top of the supporting means 3. The contact members 8, yoke 7, yoke supporting means 3, and diaphragm 2 must be so connected that sound vibrations or waves will readily pass from one to the other without chattering or substantial diminution.

The underside of the diaphragm 2, that is the side nearest the electromagnets indicated generally by the numeral 11, is provided with a ring of thin paper 12 glued thereto. The open or central part $2^1$ of the ring occupies a position opposite the electromagnets as shown in Fig. 4 and the dotted circle in Fig. 6. The diaphragm 2 is held in position before the electromagnets, as is usual in phones, between the gutta-percha or hard rubber cover 13 and the aluminum housing 14 of the electromagnets. The cover 13 is provided with interior screw threads which engage screw threads upon the exterior of the housing 14.

At the rear of the electromagnets is attached a copper or bronze plate 20 provided with fingers 21 which are bent upwardly from the plane of Fig. 5 so as to act as springs against the interior of the housing 14 when nut or cap 22 is tightened upon the screw threads 24 upon the stud 23. The stud 24 passes through a central opening at the rear of the casing 14 and the electromagnets are secured in position through the clamping action of the cap 22 and springs 21. Tightening or loosening the cap 22 enables the electromagnets to be moved from or towards the diaphragm as desired.

The electromagnets 11 may be of the usual construction and winding as well known in the art of telephone receivers or wireless phones and include the usual permanent magnets and wire coils. The wire conduits for the sound producing currents, or the currents for vibrating the diaphragm 2, are shown at 30.

If desired one or more heavy paper ring gaskets 31 as shown in Fig. 4 may be placed between the diaphragm 2 and the aluminum casing 14 in order to prevent any chattering effect. A heavy paper gasket is also placed between the hard rubber top 13 and the diaphragm 2 for a similar purpose.

While a particular magnetic means has been described for vibrating the diaphragm 2 it is to be understood that any well known and effective electromagnetic phone or instrumentality for vibrating the diaphragm 2 to reproduce sound can be employed. Mechanical means capable of vibrating the diaphragm 2 to reproduce sound may also be employed, as distinguished from electrical means for producing the same effect, as for example the mechanical means for vibrating the diaphragm in a reproducer of a phonograph.

The yoke 7 may be replaced by a single bar or branch of similar material where it is desired to use all the energy emanating from the diaphragm for one ear, and the yoke 7 or single bar or branch may be attached directly to the vibrating diaphragm 2 instead of indirectly to it by means of the supporting means 3 and posts 4. Instead of metal of the character indicated, the yoke 7, or its single bar or branch substitute, may be formed of wood or any other material capable of carrying and transmitting sound vibrations through its substance from the diaphragm 2 to the distal ends where contact is made with the mastoid eminence or parts of the head in the vicinity thereof.

The wire conduits 30 are connected in practice into any circuit, such as a radio receiving circuit, telephone receiving circuit, or circuit containing a microphone, capable of energizing the electromagnets of the phone to reproduce sound in accordance with variations in the current in said circuit. The apparatus herein shown and described may accordingly replace the ordinary telephone receiver of the present telephone, or the phone or loud speaker of a radio receiver by merely connecting it in the circuit to replace these. In ordinary telegraphy it may be used in the receiving circuit instead of the usual sounder.

In practicing my invention the contacts 8 are brought in firm contact with the skin above the mastoid eminences behind each ear and the diaphragm vibrated by variations in electrical current or mechanical energy to reproduce sound vibrations or waves in the manner indicated above. The pitch or tone of the vibrations may be regulated by adjusting the cap 22, or regulation may be accomplished by the use of other means as by adjustable resistances in series with the coils of the electromagnets. The normal separation of the contacts 8 should be such that when the arms of the yoke are spread apart to fit each side of the head sufficient pressure is developed by the tendency of the yoke arms to come together by virtue of their springiness, as to hold the contacts 8 firmly against the skin of the head.

Persons having normal hearing will find it best to occlude their auditory canals to exclude the double euphony which is the result of receiving sound vibrations from the two sources concurrently. The hearing perception will be proportional to the nerve reaction found in each individual. The sound vibrations are continued or carried from the diaphragm 2 unchanged in their character through each arm of the yoke 7 to the distal ends of the same and through the mother of pearl contacts 8 to the skin over the mastoid eminence. The vibrations are received by the afferent nerves of the skin and the bone beneath the skin and conducted inwardly to the centers of hearing. The advantages of my invention are numerous and will be readily apparent to those skilled in the art to which the invention appertains.

Having described my invention what I claim is:

1. The method of transmitting speech and other sound impulses directly to the auditory nerves which comprises electrically vibrating a diaphragm to reproduce sound impulses, conducting the reproduced sound impulses directly from said diaphragm through a lengthwise rigid conductor of sound and propagating said impulses along the lengthwise rigid conductor and continuing the conduction of the reproduced impulses to the skin of the head in close proximity to the mastoid eminence, such conduction being always in a lengthwise rigid conductor of sound from the diaphragm all the way to said point of application.

2. The method of transmitting speech and other sound impulses directly to the auditory nerves for improving the sense of hearing, which comprises electromagnetically vibrating a diaphragm to reproduce sound impulses, conducting the reproduced impulses directly from said diaphragm through a lengthwise rigid conductor of sound extending from the surface of the diaphragm to the mastoid area of the head, whereby the reproduced impulses are propagated along the lengthwise rigid conductor and are directly imparted to the mastoid area and thence along the bone beneath the mastoid area to the auditory nerve.

3. The method of transmitting speech and other sound impulses directly to the auditory nerves which comprises electromagnetically vibrating a diaphragm to reproduce sound impulses, conducting the reproduced impulses directly from a marginal portion of said diaphragm through a lengthwise rigid conductor of sound extending away from the surface of the diaphragm in the general direction in which said diaphragm vibrates to reproduce said impulses, and continuing the conduction of the reproduced sound impulses in a lengthwise rigid conductor of sound to the skin of the head in close proximity to the mastoid eminence.

4. In an acoustical apparatus of the character described, electromagnetic means for reproducing sound including a vibratory diaphragm in which sound impulses are reproduced, a stiff extension rigidly connected to the marginal portion of the surface of said vibratory diaphragm, said extension being of sound transmitting material and adapted to receive sound impulses directly from said vibratory diaphragm, said extension having a contact portion for touching the skin of the head.

5. In an acoustical apparatus of the character described, a thin diaphragm of magnetic material, electromagnetic means for reproducing sound impulses in said diaphragm, a stiff extension rigidly connected to a plurality of points near the margin of the surface of said diaphragm in which sound impulses are reproduced, said extension being of sound transmitting material and adapted to receive sound impulses directly from said diaphragm, said extension having a contact portion for touching the skin of the head.

In testimony whereof I affix my signature.

JOEL W. MacDONALD.